United States Patent
Lethellier (12)

(10) Patent No.: US 6,625,045 B1
(45) Date of Patent: Sep. 23, 2003

(54) MULTIPHASE MODULAR POWER MODULE EMPLOYING STAR LINK TOPOGRAPHY

(75) Inventor: Patrice R. Lethellier, Oxnard, CA (US)

(73) Assignee: Semtech Corporation, Newbury Park, CA (US)

( * ) Notice: Subject to any disclaimer, the term of this patent is extended or adjusted under 35 U.S.C. 154(b) by 0 days.

(21) Appl. No.: 10/034,347

(22) Filed: Dec. 28, 2001

(51) Int. Cl.⁷ .............................. H02M 3/24; H02M 7/06
(52) U.S. Cl. .......................................... 363/89; 363/126
(58) Field of Search .......................... 363/89, 126, 129, 363/64, 26, 41, 37, 65; 323/282, 284, 286, 272

(56) References Cited

U.S. PATENT DOCUMENTS

| | | | |
|---|---|---|---|
| 4,174,534 A | * 11/1979 | Kotlarewsky | 363/26 |
| 5,793,191 A | * 8/1998 | Elmore et al. | 323/272 |
| 6,466,469 B1 | * 10/2002 | Caruthers et al. | 363/72 |

OTHER PUBLICATIONS

Linear Technology, "PolyPhase, High Efficiency, Synchronous Step–Down Switching Regulator", Aug. 1999, Final Electrical Specifications, LTC 1629, pp. 1–24.

* cited by examiner

Primary Examiner—Rajnikant B. Patel
(74) Attorney, Agent, or Firm—Thelen Reid & Priest LLP; Steven J. Robbins

(57) ABSTRACT

A power module for a power system adapted to employ a star link topography. The power module includes a star section having an internal clock connection and a star link connection. The power system includes a plurality of power modules that each have a substantially similar star section. The star section utilizes an oscillating signal to generate an internal clock signal. The star section utilizes a star link signal to determine the phase of the oscillating signal. Either the addition of a power module to a power system or the removal of a power module from a power system including at least three power modules will result in the adjustment of the spread of the phases of each of the power modules to an amount about equal to 360 degrees divided by the number of power modules in the power system.

4 Claims, 4 Drawing Sheets

MULTIPHASE MODULAR POWER MODULE EMPLOYING STAR LINK TOPOGRAPHY

FIELD OF THE INVENTION

The present invention relates generally to power modules for microprocessors. More specifically, the present invention relates to a multiphase modular power module that employs a star link topography.

BACKGROUND OF THE INVENTION

It goes without saying that electronic devices need a source of power. Often the power supplied by the source needs to be converted from one form to another before it can be used. The design of the power converter will depend at least in part on the device being supplied. For example, at this point in time, there appears to be a continuing trend for microprocessor designers to demand from their power converters more and more current at lower and lower voltages. To a point, this can be achieved with a single power converter that is made bigger and bigger. However, there comes a time when the bigger single power converter generates too much localized heat and noise for the overall device design. It may also become too large for the physical space allowed. At such a time, among others, an alternative is desirable.

BRIEF DESCRIPTION OF THE INVENTION

A power module for a power system adapted to employ a star link topography is disclosed. The power module includes a star section having an internal clock connection and a star link connection. The power system includes a plurality of power modules that each have a substantially similar star section. The star section utilizes an oscillating signal to generate an internal clock signal. The star section utilizes a star link signal to determine the phase of the oscillating signal. Either the addition of a power module to a power system or the removal of a power module from a power system including at least three power modules will result in the adjustment of the spread of the phases of each of the power modules to an amount about equal to 360 degrees divided by the number of power modules in the power system.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Figure 1:
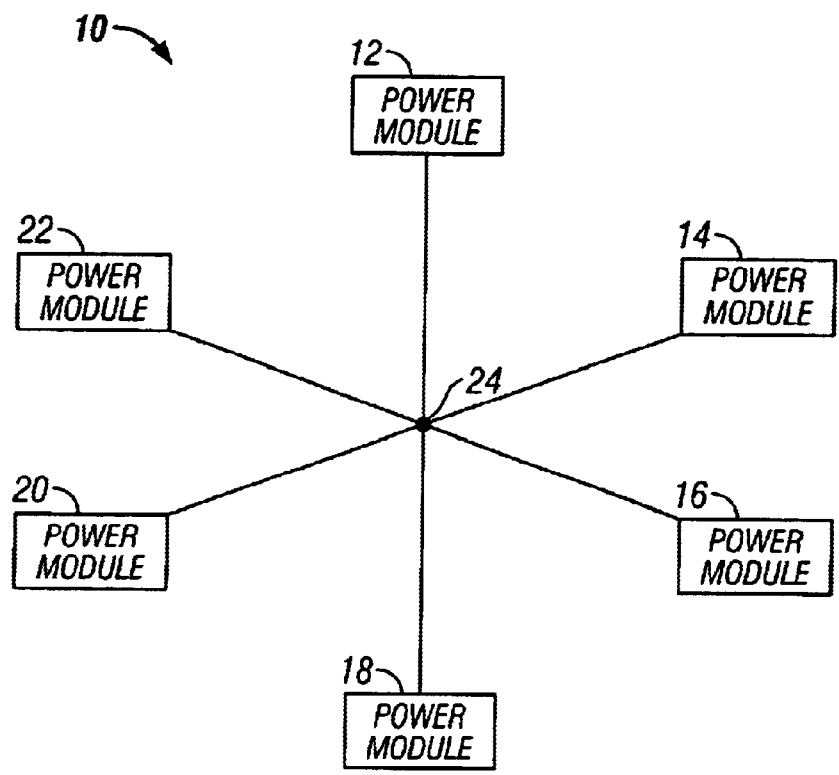
FIG. 1 is a block diagram of a power system having a plurality of power modules arranged in a star link topography.

Various exemplary embodiments of the present invention are described herein in the context of a multiphase modular power module that employs a star link topography. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

One alternative to having one bigger power converter is to have a number of smaller power converters working together, that is, a modular approach. The smaller power converters should be coordinated is some manner. This coordination or linking allows for current sharing among the power converters for stress equalization. One would prefer not to stress one particular power converter as that may lead to its premature failure. If, however, multiple power converters are to be employed, one would prefer to spread their phases out for ripple cancellation. The smaller power converters should be more compact, at least individually if not also in total, and easier to cool. The smaller power converters can be located such that they should produce less interference, in the form of noise, with the data paths. Under a modular approach, one should be able to simply add another module to meet increasing demands rather than completely redesigning the power system of the device. One may also be able to design in a certain amount of redundancy by using more modules than needed to allow for some failures of the modules. For example, a design incorporating a single redundant module could prevent a complete device failure resulting from a single module failure.

The coordinating or linking of the power modules may take several forms. One form is what is known as a master-slave relationship. In some manner, one of the power modules is designated as the master module. This designation may be by design or by election, among others. It may also be the case that a specialized controller is used instead, but the control is often the same. The master module takes sole responsibility for controlling the various slave power modules. The various slave power modules take commands from the master module. Communication between the master and the slaves may be by a dedicated bus or by a token ring, among others. Among potential drawbacks to this form of coordination is that all control is with the master module. If the master module fails, then the system may fail. Further, if a dedicated controller is used, this adds to the cost and complexity of the design. Depending on the circumstances, it may be the case that the design becomes rigid and lacks the flexibility to add modules without significant changes to the design.

Another form of coordination is known as a daisy chain, that is, the first module is connected to the next, which is connected to the next, and so on until the last module is connected back to the first module to form a ring or chain. There are no master or slave modules. All of the modules are the same. Among potential drawbacks to this form of coordination may be that when one module fails, the chain is broken and the system fails. Further, if one wants to add a module, then the system may have to be shut down to break the chain, insert the module, and reestablish the chain.

Another form of coordination is known as a star link topology, that is, all of the modules are connected to a single common link or node which can schematically look like a star with a center node and the modules radiating out. Among the potential advantages of this form of coordination may be the small number of connections needed. It may be possible and desirable to use only a single connection. Further, there are no master or slave modules as all of the modules are substantially the same. Further still, the star link remains intact even with a single module failure and thereby potentially avoids a complete system failure.

Turning first to FIG. 1, a block diagram of a power system 10 having a plurality of power modules arranged in a star link topography is shown. In this instance and purely as an example, there are six power modules 12–22 shown connected to a common link or node 24. It is important to note that the number of power modules is not fixed and will vary with circumstances and preferences.

Figure 2:
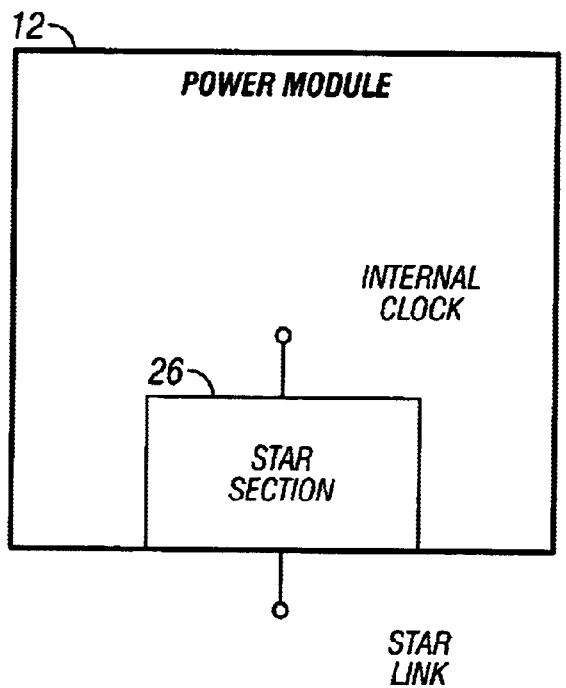
FIG. 2 is a block diagram of the power module of FIG. 1.

Turning now to FIG. 2, a block diagram of the power module 12 of FIG. 1 is shown. The power module 12 includes a star section 26. The star section 26 is shown to be integral to the power module 12, but this would not necessarily be the case. The star section 26 includes two connections. The first connection is from the star section 26 to the internal clock of the power module 12. The second connection is from the star section 26 to the star link 24 of FIG. 1. Both the power module 12 and the star section 26 will have additional connections, such as power and ground, which are not shown for the sake of clarity. The star section 26 generates an internal clock signal for the power module 12 and utilizes a star link signal to synchronize the phase of the power module 12 as required. The phase of the power module 12 depends on how many modules there are in the power system 10 of FIG. 1. Each of the plurality of power modules is spaced evenly about the 360 degree range. For example, if there were two power modules, then they would be spaced 180 degrees apart, that is, 360 divided by two. If there were three power modules, then they would be spaced 120 degrees apart. If, as shown in FIG. 1, there were six power modules, then they would be spaced 60 degrees apart. Recall that phase spacing helps to reduce any ripple in the output power signal of the power system 10. It is not required that the phase spacing be exact.

Figure 3:
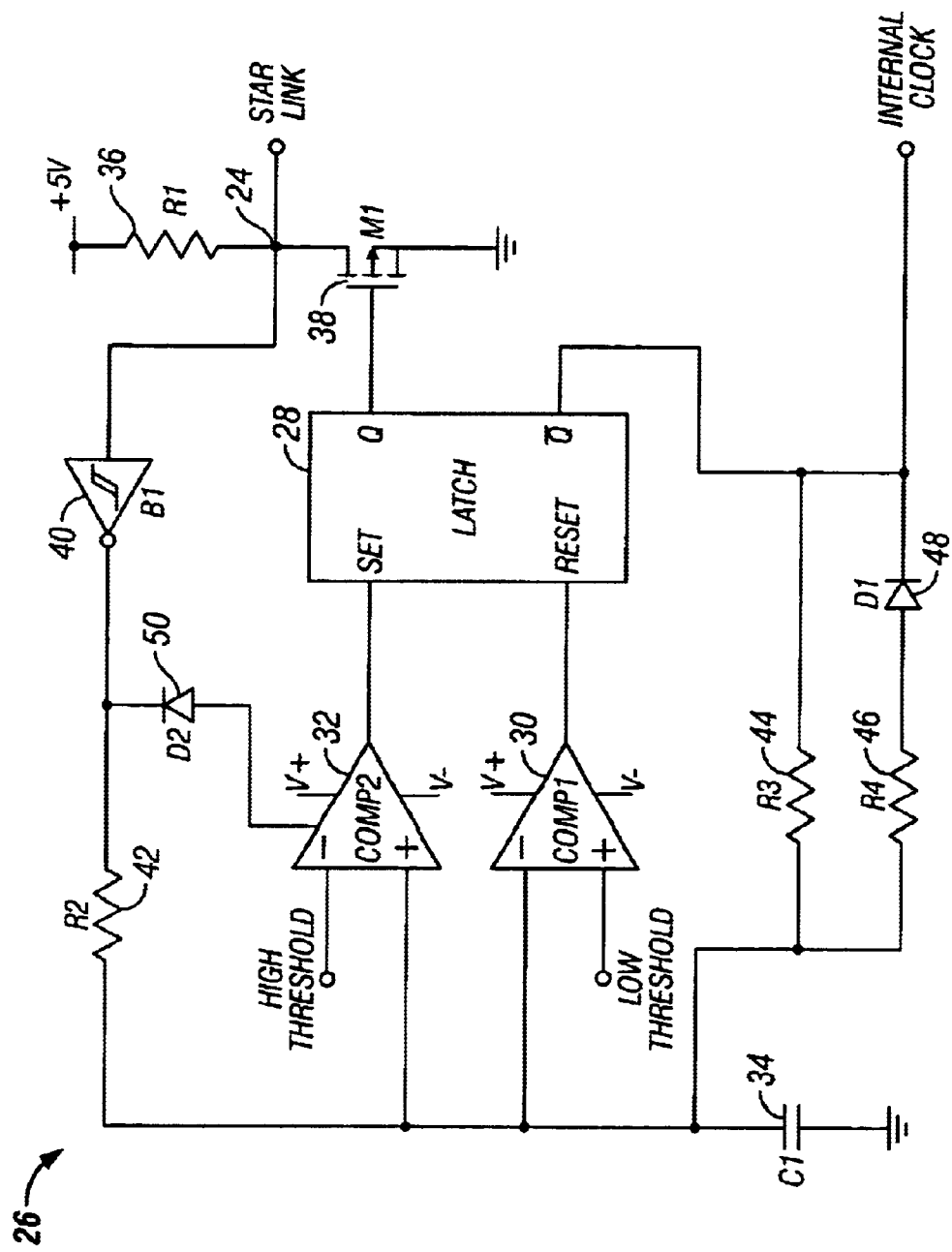
FIG. 3 is a circuit diagram of the star section of FIG. 2.

Turning now to FIG. 3, a circuit-diagram of the star section 26 of FIG. 2 is shown. Once again the two connections are shown to the star link and to the internal clock. The star section 26 includes a latch 28, a first comparator COMP1 30, a second comparator COMP2 32, and a capacitor C1 34. Together, these form the basis of an oscillator. The positive input of the second comparator 32 monitors the voltage on the capacitor 34. The negative input of the second comparator 32 monitors a predetermined high threshold value. The high threshold value can be internally or externally generated. When the voltage on the capacitor 34 reaches the high threshold, the second comparator 32 sets the latch 28. The negative input of the first comparator 30 also monitors the voltage on the capacitor 34. The positive input of the first comparator 30 monitors a predetermined low threshold value. The low threshold value can also be internally or externally generated. When the voltage on the capacitor 34 drops to the low threshold, the first comparator 30 resets the latch 28. The setting and resetting of the latch 28 generates the internal clock signal through the Q-Bar output pin of the latch 28. Although the capacitor 34 is shown to be integral to the star section 26, greater design flexibility may be realized by making the capacitor 34 an external element to both the star section 26 and the power module 12 of FIG. 2.

The capacitor 34 is connected indirectly to the star link signal as shown. Electrically, this connection point is the same as node 24 of FIG. 1 and hence it has been labeled accordingly. Also connected to node 24 is a first resistor R1 which is in turn connected to a positive voltage such as five volts. The first resistor 36 is also connected to a transistor M1 38. The transistor 38 is switched on and off by the Q output pin of the latch 28. Connected in series between the node 24 and the capacitor 34 are an optional buffer B1 40 and a second resistor R2 42. Since the star link is connected externally to the power module 12 of FIG. 2, there is a chance that it may carry unwanted noise. If so, then the buffer may be desirable to block this noise. The second resistor 42 plays a role in the phase spacing which will be discussed in more detail below. The capacitor 34 is connected directly to a third resistor R3 44 and to a series combination of a fourth resistor R4 46 and a first diode D1 48. These elements serve to charge and discharge the capacitor 34. Also shown is a second diode D2 50. The second diode 50 is optional and serves as a clamp to knock down the strobe pin on the second comparator 32.

Although to this point in the discussion it has been assumed that the power system 10 of FIG. 1 included a plurality of power modules, that would not have to be the case. The power module 12 with the star section 26 of FIG. 2 will function normally on its own. Whether a single power module is sufficient for the demands of the device will depend on the circumstances. Of course the value of the star section 26 is not fully realized when there is only a single power module. Nevertheless, since it does give a designer the flexibility to add power modules later, one may choose to start with only a single power module in the expectation that more will be needed in the future. In part to demonstrate the operation of a single power module and in part to contrast it to the operation of multiple power modules, the operation of a single power module will now be presented.

Figure 4:
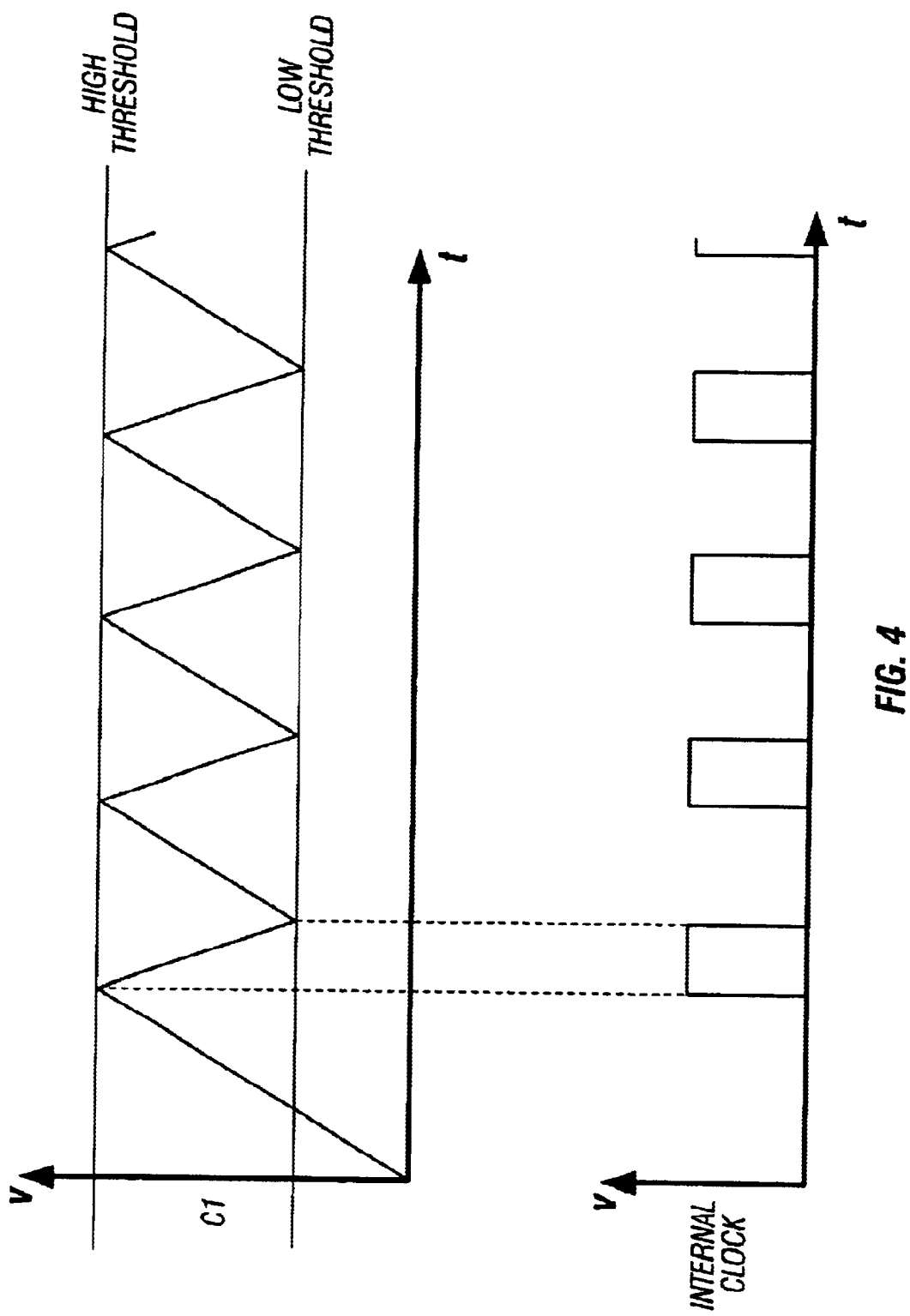
FIG. 4 is a pair of voltage graphs for the star section of FIG. 3.

Turning now to FIG. 4, a pair of voltage graphs for the star section 26 of FIG. 3 are shown. Both graphs have been idealized for discussion purposes and contain relative values and timing information. The exact values and timing will depend on the circumstances and are unnecessary for this discussion. The upper graph is that of the voltage across the capacitor 34 of FIG. 3. The lower graph is that of the internal clock signal generated by the Q-Bar output pin of the latch 28 of FIG. 3. As can be seen in the upper graph, the initial voltage on the capacitor 34 is zero and increases as the capacitor 34 charges. When the charge reaches the high threshold value, the second comparator 32 of FIG. 3 is triggered to set the latch 28. This begins the discharge of the capacitor 34 and the generation of the internal clock signal as can be seen in the lower graph. The rates of charge and discharge of the capacitor 34 are set by the third and fourth resistors 44 46 of FIG. 3 and the rates may vary from one another. Eventually, the capacitor 34 discharges down to the low threshold value where the first comparator 30 of FIG. 3 is triggered to reset the latch 28. This begins the charge of the capacitor 34 again and terminates the internal clock signal as can be seen in the lower graph. The charging and discharging of the capacitor 34 between the high and low thresholds continues until the power module is shut down. The oscillation of the voltage of the capacitor 34 is a simple saw tooth which becomes established and regular within the first cycle. As suggested above, the star link plays no special role in the function of the star section when operating as a single power module.

Now assume that there are only two power modules in the power system 10 of FIG. 1. Each power module will have a star section 26 of FIG. 3 with the elements shown. For discussion purposes, one power module will be referred to as "A" and the other power module will be referred to as "B". Likewise, the elements of each star section 26 will be referred to as, for example, the capacitor A 34 and the capacitor B 34, respectively. Remember that the two power modules are tied together by the star link at node 24 of FIGS. 1 and 3.

Figure 5:
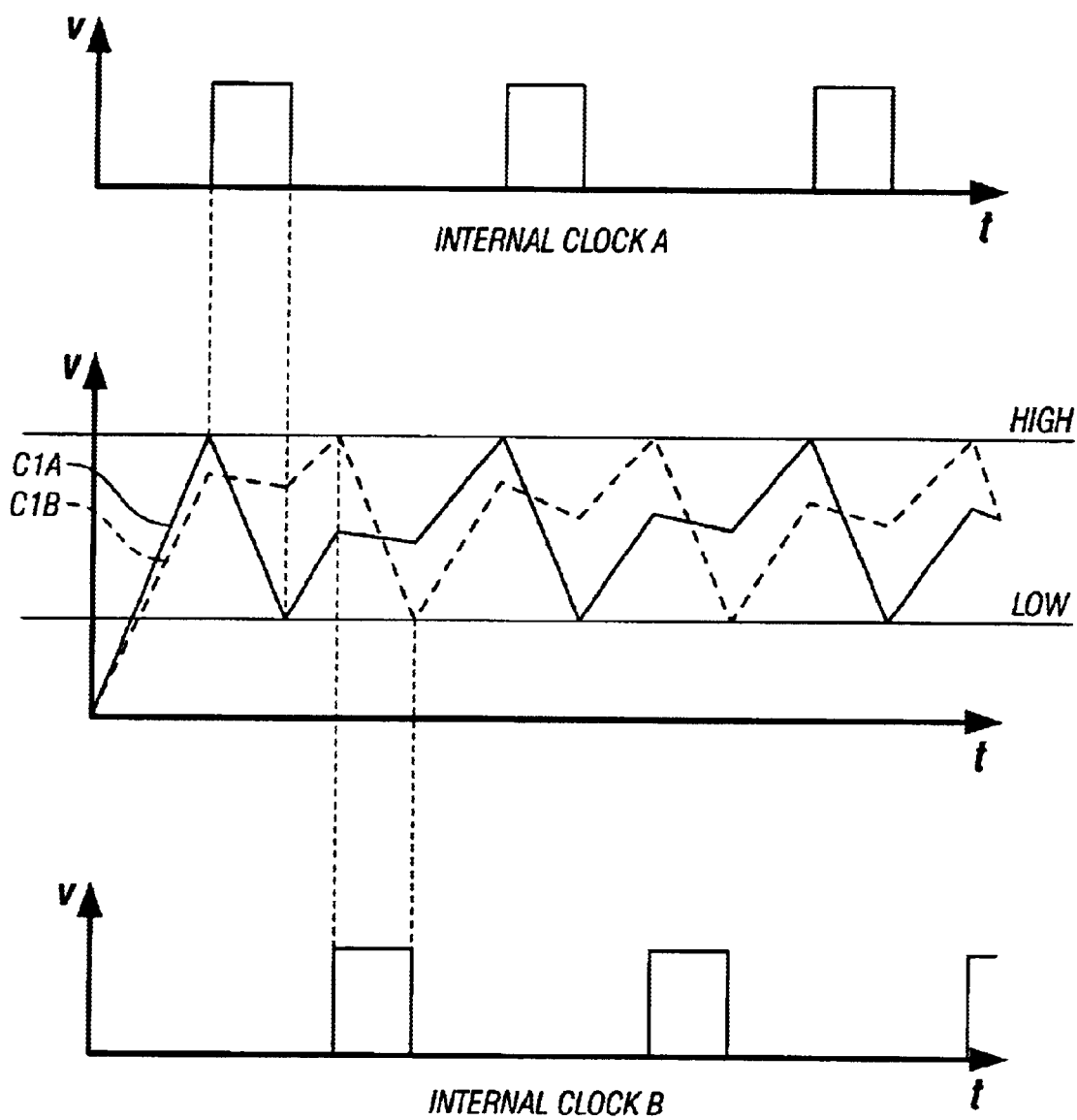
FIG. 5 is a trio of voltage graphs for two star sections 26 of FIG. 3.

Turning now to FIG. 5, a trio of voltage graphs for two star sections 26 of FIG. 3 are shown. Again these graphs have been idealized for discussion purposes and contain relative values and timing information. The middle graph is that of the voltage across the capacitor A 34 of the power module A as a solid line and the voltage across the capacitor B 34 of the power module B as a dashed line. The upper graph is that of the internal clock A, signal generated by the Q-Bar output pin of the latch A 28 of the power module A. The lower graph is that of the internal clock B signal generated by the Q-Bar output pin of the latch B 28 of the power module B. As above, the initial voltages of both capacitors is zero as can be seen in the middle graph. At this point, the initial charging of the two capacitors can be likened to a race to see which one will reach the high threshold value first. As shown, the capacitor A 34 reaches the high threshold value first. It is not important which is first. It is highly unlikely that they will reach the high threshold simultaneously even if they have the same component value due to manufacturing tolerances and random external influences. Simultaneity can be prevented or resolved with minor circuit changes, but these do not appear to be practically required.

When the charge on the capacitor A 34 reaches the high threshold value, the second comparator A 32 is triggered to set the latch A 28. This begins the discharge of the capacitor A 34 and the generation of the internal clock A signal as can be seen in the upper graph. This also turns on the transistor A 38 which prevents the capacitor B 34 from reaching the high threshold and causes the capacitor B 34 to also begin to discharge but at a much lower rate than the capacitor A 34.

Eventually, the capacitor A 34 discharges down to the low threshold value where the first comparator A 30 is triggered to reset the latch A 28. This begins the charge of the capacitor A 34 again and terminates the internal clock signal as can be seen in the upper graph. This also turns off the transistor A 38 which allows the charging again of the capacitor B 34. As above, this can be likened to a race to see which capacitor reaches the high threshold value first, but this time the capacitor B 34 has a head start and is assured of a win.

When the charge on the capacitor B 34 reaches the high threshold value, the second comparator B 32 is triggered to set the latch B 28. This begins the discharge of the capacitor B 34 and the generation of the internal clock B signal as can be seen in the lower graph. This also turns on the transistor B 38 which prevents the capacitor A 34 from reaching the high threshold and causes the capacitor A 34 to also begin to discharge but at a much lower rate than the capacitor B 34.

Eventually, the capacitor B 34 discharges down to the low threshold value where the first comparator B 30 is triggered to reset the latch B 28. This begins the charge of the capacitor B 34 again and terminates the internal clock signal as can be seen in the lower graph. This also turns off the transistor B 38 which allows the charging again of the capacitor A 34. Once more, this can be likened to a race to see which capacitor reaches the high threshold value first, but this time the capacitor A 34 rather than the capacitor B 34 has a head start and is assured of a win.

The charging and discharging of both capacitors between the high and low thresholds continues until one or the other or both power modules are shut down. The oscillation of the voltage of both capacitors is a more complex saw tooth than the single power module example of FIG. 4. Further, the oscillation may not become established and regular within the first cycle. The number of cycles will depend on the circumstances but is generally small. At high switching speeds, the difference in the number of cycles is insignificant.

A review of the middle graph will demonstrate at least part of the significance of the star link when two or more power modules are employed. The star link acts to spread out the phases of the two power modules A and B. Each is performing substantially the same function but they are doing so at different times. In this case, the phases are spread 180 degrees apart. Substantially the same result is achieved with three and more power modules except that the saw tooth becomes more complex and the number of cycles before establishment of a regular oscillation is greater. The resulting phase spacing is the desired 360 degrees divided by the number of power modules. In fact, the addition or removal of power modules can be performed largely at any time. Whether the change is by accident or by design, the star link sections will re-coordinate the phase spacing for the number of power modules in use at the time. This will not happen instantaneously, but it should happen automatically. As eluded to above, this phase spacing ability is determined in part by the careful but not critical selection of the component value for the second resistor 42 of FIG. 3. The value will depend in part on the circumstances and can be relatively easily determined by one of ordinary skill in the art. The latter is true for the component values of the first resistor 36 and the transistor 38 of FIG. 3 as well.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A star section for use with a power module for a power system adapted to employ a star link topography, the power module having an internal clock connection, the star section having an internal clock output and a star link input, the star section comprising:

a latch having a set input, a reset input, an output, and an inverted output, wherein the inverted output is connected to an internal clock node coupled to the internal clock output;

a first comparator having a first input, a second input, and an output, wherein the first input is connected to a predetermined low threshold voltage and the output is connected to the reset input of the latch;

a second comparator having a first input, a second input, and an output, wherein the second input is connected to a predetermined high threshold voltage and the output is connected to the set input of the latch;

a capacitor node for connection to one lead of a capacitor where the other lead of the capacitor is connected to a first reference voltage, wherein the second input of the first comparator and the first input of the second comparator are connected to the capacitor node;

a first resistor connected between a second reference voltage and a star link node coupled to the star link input;

a transistor having a collector connected to the star link node, a base connected to the output of the latch, and an emitter connected to the first reference voltage;

a second resistor having a first lead connected to the star link node and a second lead connected to the capacitor node;

a third resistor connected between the internal clock node and the capacitor node;

a fourth resistor having a first lead and a second lead, wherein the first lead is connected to the capacitor node; and a first diode having an input connected to the second lead of the fourth resistor and an output connected to the internal clock node.

2. The star section as defined in claim 1, further comprising a capacitor connected between the capacitor node and the first reference voltage.

3. The star section as defined in claim 1, further comprising a buffer having an input and an output, wherein the buffer is placed between the star link node and the second resistor with the input of the buffer connected to the star link node and the output of the buffer connected to the first lead of the second resistor.

4. The star section as defined in claim 1, wherein the second comparator further comprises a strobe connection and the module further comprises a second diode having an input and an output, wherein the input is connected to the strobe connection and the output is connected to the first lead of the second resistor.

* * * * *